United States Patent [19]
Ohta

[11] 4,333,114
[45] Jun. 1, 1982

[54] RECORDING CIRCUIT EMPLOYING AC BIASING SYSTEM

[75] Inventor: Hajime Ohta, Hamamatsu, Japan

[73] Assignee: Nippon Gakki Seizo Kabushiki Kaisha, Hamamatsu, Japan

[21] Appl. No.: 100,140

[22] Filed: Dec. 4, 1979

[30] Foreign Application Priority Data

Dec. 6, 1978 [JP] Japan ............................. 53-151438

[51] Int. Cl.³ ........................ G11B 5/47; G11B 5/02
[52] U.S. Cl. ................................... 360/66; 360/68
[58] Field of Search ............................. 360/66, 68

[56] References Cited
U.S. PATENT DOCUMENTS

| | | | |
|---|---|---|---|
| 3,324,250 | 6/1967 | Skov | 360/68 |
| 3,480,739 | 11/1969 | Kinkel | 360/66 |
| 3,806,828 | 4/1974 | Johnson . | |

Primary Examiner—Vincent P. Canney
Attorney, Agent, or Firm—Cushman, Darby & Cushman

[57] ABSTRACT

A magnetic recording head, a resistor, a capacitor and another resistor are connected in series to form a bridge circuit arranged to satisfy the condition Ra·Rb=L/C, wherein Ra and Rb represent the resistance values of the resistors, respectively, L represents the inductance value of the magnetic recording head, and C represents the capacitance value of the capacitor. A recording signal is applied across a first pair of opposite junctions of the bridge circuit, and an AC biasing signal to be used in recording the recording signal is applied across a second pair of opposite junctions of this bridge circuit.

4 Claims, 3 Drawing Figures

RECORDING CIRCUIT EMPLOYING AC BIASING SYSTEM

BACKGROUND OF THE INVENTION (a) Field of the Invention

The present invention relates to a recording circuit arrangement for use in driving a magnetic recording head in a magnetic recording apparatus employing the AC biasing system.

(b) Description of the prior art

Magnetic recording apparatus such as magnetic tape recorders usually employ the so-called AC biasing system in recording signals. Such known AC biasing system is arranged so that an AC biasing signal having a frequency higher than that of recording signal for recording is applied to the magnetic recording head together with said recording signal, to thereby improve frequency response and to minimize distortion and noise.

FIG. 1 shows a typical example of a known recording circuit arrangement used for driving the magnetic recording head in a magnetic recording apparatus. More particularly, the recording signal supplied from a recording signal source 1 is amplified at an amplifier 2. This amplified recording signal is fed to a magnetic recording head 5 via a trap network formed by a parallel connection of a coil 3 and a capacitor 4. An AC biasing signal source 7 is coupled to the recording head 5 via a trimmer capacitor 8 for bias-level adjustment. Thus, the magnetic recording head 5 is driven by both the recording signal and the AC biasing signal which are superposed one upon another, so that the recording signal is recorded, in accordance with the principle of the AC biasing system, on a magnetic recording medium, such as magnetic tape, provided on the recording apparatus. The recording signal may be an audio signal of 20 to 20,000 Hz, and in such instance the AC biasing signal supplied from the signal source 7 may be an AC signal of 30 to 100 kHz.

The trap network mentioned above is a parallel resonance circuit formed by the coil 3 and the capacitor 4, and intended to prevent the undesirable flow of the AC biasing signal back to the amplifier 2. Absent such a trap the AC biasing signal, which has a frequency higher than that of the recording signal, would cause problems such as circuit saturation in the amplifier 2. On the other hand, the trap network can constitute a cause of distortion of the recording signal which passes therethrough, leading to degraded fidelity of the recording signals. Thus, ideally it is desirable to arrange that the parallel connection be omitted, and that the amplifier 2 be connected directly to the magnetic recording head 5. This arrangement, however, would lead to the above-mentioned introduction of the output of the AC biasing signal source 7 into the amplifier 2 resulting in the saturation of the latter.

SUMMARY OF THE INVENTION

It is, therefore, an object of the present invention to provide an improved recording circuit arrangement for use in driving a magnetic recording head in a magnetic recording apparatus employing an AC biasing system, in which a trap network for trapping the AC biasing signal is omitted in the recording signal path.

Another object of the present invention is to provide an improved recording circuit arrangement of the type described above, which enables recording of signals at higher fidelity of the magnetic recording head.

In one aspect of the present invention, a magnetic recording head, a resistor, a capacitor and another resistor are connected in series to form a bridge circuit, and a recording signal is applied across one pair of opposite junctions of the bridge circuit, and an AC biasing signal is applied across the other pair of opposite junctions of this bridge circuit. The bridge circuit is arranged so as to satisfy the condition $Ra \cdot Rb = L/C$, where Ra and Rb represent the resistance values of the two resistors employed in the bridge circuit, L represents the inductance value of the magnetic recording head, and C represents the capacitance value of the capacitor of this bridge circuit.

These and other objectives, features and advantages of the present invention will become apparent from the following detailed description of preferred embodiments of the present invention when taken in conjunction with the accompanying drawings.

BRIEF DESCRIPTION OF THE DRAWINGS

Like parts are indicated by like reference numerals throughout the drawings of the various embodiments.

DETAILED DESCRIPTION OF THE PREFERRED EMBODIMENTS

Figure 1:
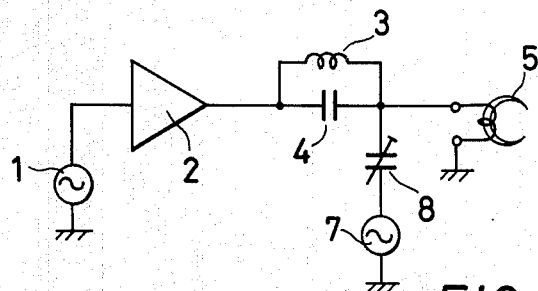
FIG. 1 is a schematic diagram showing a typical recording circuit arrangement according to the prior art.
Figure 2:
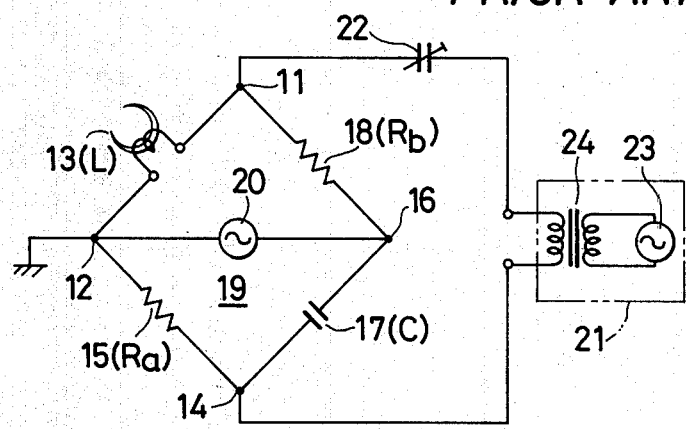
FIG. 2 is a schematic diagram showing a basic embodiment of a recording circuit arrangement according to the present invention.

FIG. 2 shows a basic embodiment of a recording circuit arrangement according to the present invention, which includes a bridge circuit 19 consisting of a magnetic recording head 13, a first resistor 15, a capacitor 17 and a second resistor 18, all of which are connected in series. Across a first pair of opposite junctions 12 and 16 of the bridge circuit 19 is coupled the output of a recording signal generating circuit 20 which generates a recording signal to be recorded by the magnetic recording head 13 of a magnetic recording apparatus. Across a second pair of opposite junctions 11 and 14 of the bridge circuit 19 is connected, via a trimmer capacitor 22, the output of an AC biasing signal generating circuit 21 which generates an AC biasing signal used, along with said recording signal, in the recording of said recording signal. The trimmer capacitor 22 is provided for adjustment of the level of the AC biasing signal which is to be applied to the bridge circuit 19. The AC biasing signal generating circuit 21 is composed of an AC biasing signal source 23 and a transformer 24 for passing the AC biasing signal supplied by the source 21 to the bridge circuit.

The aforementioned bridge circuit 19 is arranged so that its four arms, i.e. the four constituting members 13, 15, 17 and 18, satisfy the equilibrium condition $Ra \cdot Rb = L/C$, wherein Ra and Rb represent the resistance values of the resistors 15 and 18, respectively, L represents the inductance value of the recording head 13, and C represents the capacitance value of the capacitor 17. Under the above-mentioned equilibrium condition, the AC biasing signal flows in the respective arms of the bridge circuit, but does not flow in the path containing the recording signal generating circuit 20. Therefore, the recording signal generating circuit 20 is not affected by the AC biasing signal flowing in the bridge circuit. On the other hand, the recording signal flows through the respective arms of the bridge circuit, but does not flow towards the AC biasing signal generating circuit 21. Hence, the recording signal has no adverse influence on the operation of the circuit 21. Thus, the recording head 13 is driven by the recording signal and the AC biasing signal, each of which is free of mutual interference.

Consequently, according to the present invention, it is possible to supply a recording signal to the recording head without the use of the trap network that has been needed in the prior art arrangements to prevent the AC biasing signal from flowing back to the recording signal source side.

Figure 3:
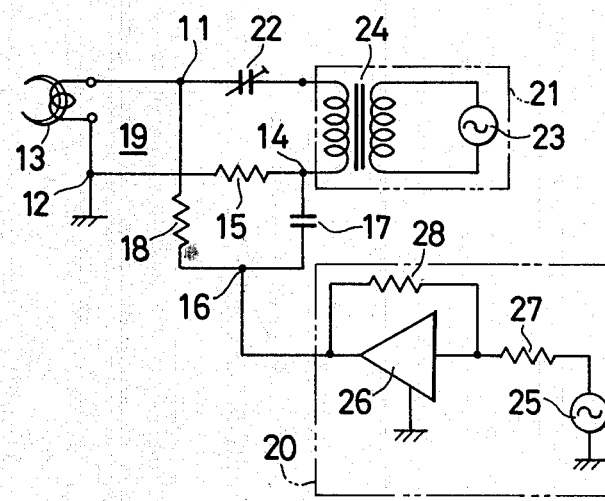
FIG. 3 is a schematic diagram showing a more practical embodiment of a recording circuit arrangement according to the present invention.

A more practical embodiment of a recording circuit arrangement according to the present invention is shown in FIG. 3, in which the recording signal generating circuit 20 is formed with a recording signal source 25, an amplifier 26 and resistors 27 and 28. The amplifier 26 and resistor 28 are arranged so as to constitute a negative feedback amplifier circuit. The recording signal supplied from the signal source 25 is amplified by the amplifier 26 before being fed to the bridge circuit 19. Other arrangements are similar to those in the preceding embodiment explained in connection with FIG. 2.

As has been described, the present invention permits elimination of the trap network required in conventional recording circuit arrangements. This omission results in less distortion of the recording signal developed in the recording circuit arrangement, and thus higher-fidelity recording is insured.

What is claimed is:

1. A recording circuit arrangement for use in driving a magnetic recording head in a magnetic recording apparatus employing an AC biasing system, comprising:
   a bridge circuit including said magnetic recording head, a first resistor, a capacitor and a second resistor connected in series to form a diamond having four junctions having a first and a second pair of opposite junctions, said first pair of opposite junctions comprising the junction of said magnetic recording head and said first resistor, and the junction of said capacitor and said second resistor, and said second pair of opposite junctions comprising the junction of said magnetic recording head and said second resistor, and the junction of said first resistor and said capacitor, said bridge circuit satisfying the condition $Ra \cdot Rb = L/C$, wherein Ra and Rb represent resistance values of the first and second resistors, respectively, L represents inductance value of the magnetic recording head, and C represents capacitance value of the capacitor;
   a recording signal generating circuit for generating a recording signal to be recorded by said magnetic recording apparatus, said recording signal being applied across said first pair of opposite junctions of said bridge circuit; and
   an AC biasing signal generating circuit for generating an AC biasing signal to be used by said magnetic recording apparatus in recording said recording signal, the AC biasing signal being applied across the second pair of opposite junctions of said bridge circuit.

2. A recording circuit arrangement according to claim 1, in which: said recording signal generating circuit comprises a recording signal source and an amplifier, the recording signal supplied from said recording signal source being amplified by said amplifier before being fed to said bridge circuit.

3. A recording circuit arrangement according to claim 1, further comprising: a trimmer capacitor through which said AC biasing signal is fed to said bridge circuit, the level of said AC biasing signal applied to said bridge circuit being adjustable by the trimmer capacitor.

4. A recording circuit arrangement according to claim 3, in which: said AC biasing signal generating circuit comprises: an AC biasing signal source and a transformer, the AC biasing signal supplied from said AC biasing signal source being fed, via the transformer and said trimmer capacitor, to said bridge circuit.

* * * * *